(12) United States Patent
Kuesel et al.

(10) Patent No.: US 8,719,404 B2
(45) Date of Patent: May 6, 2014

(54) REGULAR EXPRESSION SEARCHES UTILIZING GENERAL PURPOSE PROCESSORS ON A NETWORK INTERCONNECT

(75) Inventors: Jamie R. Kuesel, Rochester, MN (US); Mark G. Kupferschmidt, Rochester, MN (US); Paul E. Schardt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 13/036,779

(22) Filed: Feb. 28, 2011

(65) Prior Publication Data

US 2012/0221711 A1    Aug. 30, 2012

(51) Int. Cl.
G06F 15/177    (2006.01)

(52) U.S. Cl.
USPC ........................................ 709/224

(58) Field of Classification Search
USPC ................................. 709/223–226
See application file for complete search history.

(56) References Cited

U.S. PATENT DOCUMENTS

| | | | |
|---|---|---|---|
| 6,760,756 B1 * | 7/2004 | Davis et al. .................. | 709/215 |
| 7,486,673 B2 | 2/2009 | Harijono et al. | |
| 7,716,330 B2 * | 5/2010 | Kulig et al. .................. | 709/225 |
| 8,020,163 B2 | 9/2011 | Nollet et al. | |
| 8,151,245 B2 | 4/2012 | Oberlin et al. | |
| 8,214,845 B2 | 7/2012 | Hoover et al. | |
| 2006/0136570 A1 * | 6/2006 | Pandya ......................... | 709/217 |
| 2008/0140991 A1 | 6/2008 | Pandya | |
| 2008/0186974 A1 * | 8/2008 | Singh et al. ................ | 370/395.3 |
| 2009/0063825 A1 | 3/2009 | McMillen et al. | |
| 2009/0282222 A1 | 11/2009 | Hoover et al. | |

FOREIGN PATENT DOCUMENTS

| | | |
|---|---|---|
| EP | 1966713 A2 | 9/2008 |
| WO | 2004072797 A2 | 8/2004 |
| WO | 2007079095 A2 | 7/2007 |
| WO | 2008097710 A2 | 8/2008 |

OTHER PUBLICATIONS

U.S. Appl. No. 12/255,827—Non-Final Office Action Mailed Aug. 14, 2012.
Sailesh Kumari et al., "Algorithms to accelerate multiple regular expressions matching for deep packet inspection", Sep. 2006.
U.S. Appl. No. 12/255,827, "Data Structure for Controlling an Algorithm Performed on a Unit of Work in a Highly Threaded Network on a Chip" by Eric Mejdrich et al., filed Oct. 22, 2008.

* cited by examiner

*Primary Examiner* — Benjamin R Bruckart
*Assistant Examiner* — Sibte Bukhari
(74) *Attorney, Agent, or Firm* — Jim Boice

(57) ABSTRACT

A first hardware node in a network interconnect receives a data packet from a network. The first hardware node examines the data packet for a regular expression. In response to the first hardware node failing to identify the regular expression in the data packet, the data packet is forwarded to a second hardware node in the network interconnect for further examination of the data packet in order to search for the regular expression in the data packet.

17 Claims, 6 Drawing Sheets

US 8,719,404 B2

REGULAR EXPRESSION SEARCHES UTILIZING GENERAL PURPOSE PROCESSORS ON A NETWORK INTERCONNECT

BACKGROUND

The present disclosure relates to the field of computer networks, and specifically to handling data packets on computer networks. Still more particularly, the present disclosure relates to searching for regular expressions in data packets on network computers.

A regular expression is a predetermined sequence of characters in a data packet such as a message. Regular expressions may or may not be complete words or phrases. For example, "resid" is a regular expression that, by itself, is meaningless. However, when a computer searches for the characters "resid", it will identify any incidence in data packets of the presence of any words/phrases that include the regular expression "resid", including the words "reside", "residence", "resident", all of which are relevant to a search for information about where someone lives. Similarly, a computer may search for regular expressions that are actual words/phrases ("residency", "home residence", etc), as well as known identifiers ("ADDR", etc.). This search for regular expressions is one example of how data packets can be managed.

BRIEF SUMMARY

In one embodiment, a computer implemented method manages data packets received from a network. A first hardware node in a network interconnect receives a data packet from a network. The first hardware node examines the data packet for a regular expression, wherein the regular expression is a predefined pattern of characters. In response to the first hardware node failing to identify the regular expression in the data packet, the data packet is forwarded to a second hardware node in the network interconnect for further examination of the data packet in order to search for the regular expression in the data packet.

In one embodiment, network interconnect is oriented within a network to intercept data packets on the network. The network interconnect comprises a first hardware node in the network interconnect for receiving the data packet from the network, wherein the first hardware node comprises logic for examining the data packet for a regular expression. The network interconnect also comprises a second hardware node in the network interconnect, wherein the second hardware node receives the data packet from the first hardware node in response to the first hardware node failing to identify the regular expression in the data packet, and wherein the second hardware node further examines the data packet in order to search for the regular expression in the data packet.

In one embodiment, a computer-readable storage medium is encoded with a computer program. The computer program comprising computer executable instructions configured for: receiving, by a first hardware node in a network interconnect, a data packet from a network; examining, by the first hardware node in the network interconnect, the data packet for a regular expression, wherein the regular expression is a predefined pattern of characters; and in response to the first hardware node failing to identify the regular expression in the data packet, forwarding the data packet to a second hardware node in the network interconnect for further examination of the data packet in order to search for the regular expression in the data packet.

The above, as well as additional purposes, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
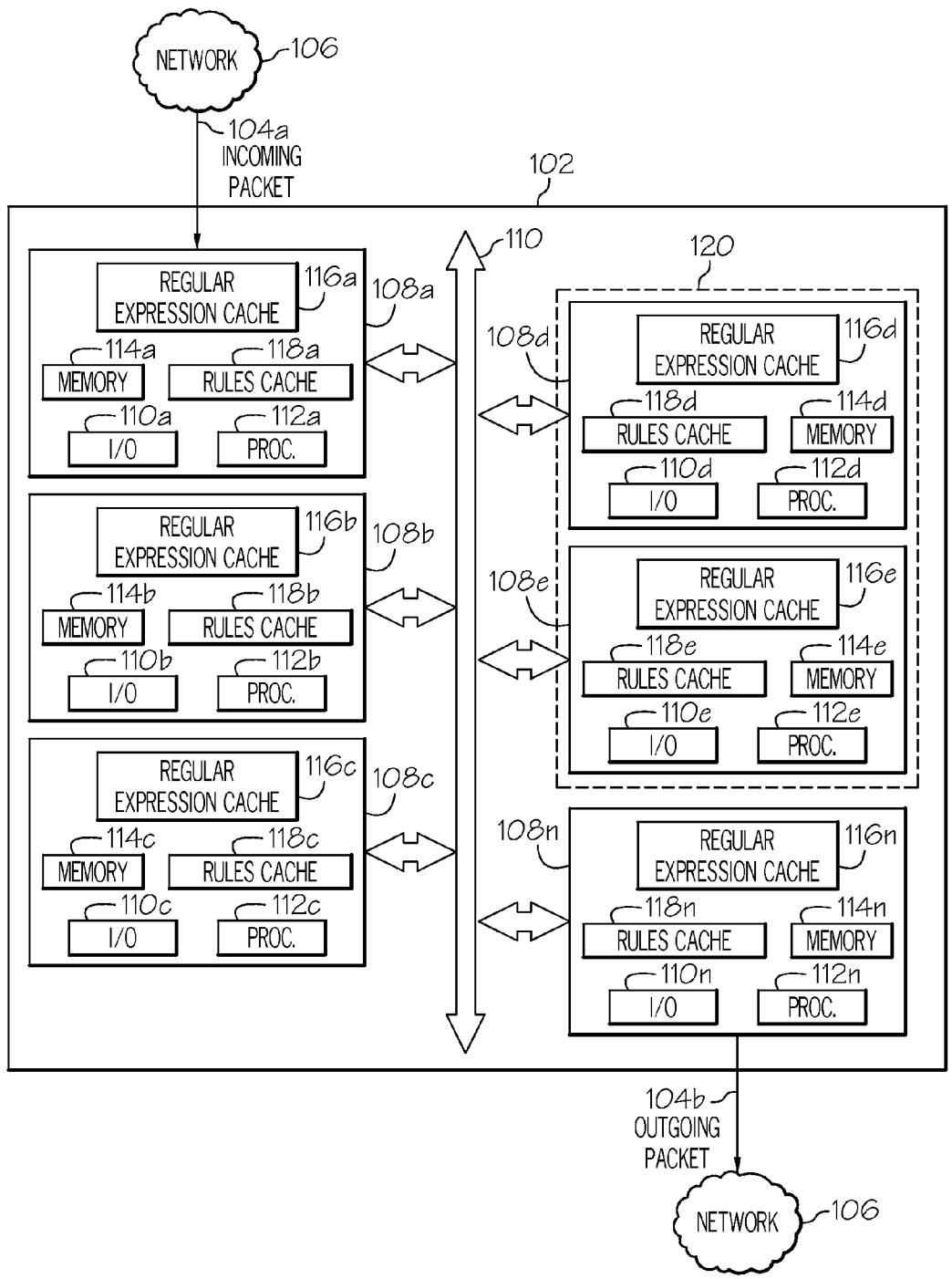
FIG. 1 depicts a high-level depiction of an exemplary network interconnect as contemplated for use by the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and particularly to FIG. 1, an exemplary network interconnect 102 is presented. Network interconnect 102 is an edge of network logic that manages data packets, such as incoming packet 104a, which is being sent through a network 106. Network interconnect 102 utilizes on-chip nodes 108a-n (where "n" is an integer) to search for regular expressions in the incoming packet 104a. As defined above, a regular expression is a predefined pattern of characters. These characters may be letters, integers, symbols, or any other computer-coded character. In one embodiment, when the incoming packet 104a arrives at the network interconnect 102, it is initially received by the network interconnect 102 at a first hardware node 108a, which acts as 1) a preliminary logic for searching for certain regular expressions, and 2) routing logic for routing the incoming packet 104a to one or more of the other hardware nodes 108b-n.

As depicted, each of the hardware nodes 108a-n has an input/output (I/O) interface 110, which allow each of the hardware nodes 108a-n to communicate with one another. Also within each of the hardware nodes 108a-n is a processing unit (one of elements 112a-n), which may include one or more processors, each of which may include one or more processor cores, each of which may include one or more hardware threads. Each of the processing units 112a-n has an associated system memory (from elements 114a-n), on which is loaded software for performing the process described herein, including the steps depicted below in FIG. 3 as well as those described elsewhere in the present disclosure.

As described herein, in one embodiment, if the first hardware node 108a is unsuccessful in identifying, within the incoming packet 104a, any regular expression (or a regular expression that has been preselected for being searched) that is stored within its regular expression cache 116a, then the first hardware node 108a will send the incoming packet 104a to a second hardware node (e.g., hardware node 108b) for further examination of the incoming packet 104a, in order to search for any regular expression (or a regular expression that has been preselected for being searched) that is stored within its regular expression cache 116b.

Note that each (or alternatively less than all) of the hardware nodes 108a-n has a rules cache 118. Rules stored within the rules caches 118a-n provide directions on how to manage the incoming packet 104a. This management includes where to direct the incoming packet when it is placed back onto the network 106 (as the outgoing packet 104b); which of the hardware nodes 108a-n are to process the incoming packet 104a (including the search for regular expressions); which incoming packets are to receive priority handling/execution/searching, etc. In one embodiment, the incoming packet 104a includes a new rule, which will be stored in one or more of the rules caches 118a-n. In one embodiment, the newly received rule will replace an old rule that was previously stored in one or more of the rules caches 118a-n.

For example, assume that the new rule defines a new set of regular expressions that are to be searched by the network interconnect 102. This new rule will result in one or more of the regular expression caches 116a-n being populated with the new set of regular expressions. Thus, a hardware node 108 that has this new set of regular expressions will then have a local copy of the regular expression with which to compare when searching the incoming packet 104a. Thus, implementing the new rule allows the network interconnect 102 to autonomously update itself, without the need for an outside controller.

In one embodiment, assume that the new rule describes a new destination location (e.g., an Internet Protocol (IP) address) on the network 106. In this embodiment, an egress node (e.g., hardware node 108n) will obey the new rule to send the outgoing packet 104b (after it has been processed by the network interconnect 102, including searching for regular expressions) to that new destination location on the network 106.

In one embodiment, there is a hierarchy established for one or more of the hardware nodes 108a-n. For example, assume that hardware node 108e is higher in this hierarchy than hardware node 108d, as depicted in hierarchy 120. As such, hardware node 108e is deemed to be capable of detecting more complex regular expressions (e.g., longer regular expressions, regular expressions that have more components, regular expressions that are tied to particular parameters/rules/etc.) than hardware node 108d. Thus, if a particular regular expression is being searched (according to a rule or instruction found within the incoming packet 104a or according to a rule already stored in one of the rules caches 118a-n in hardware nodes 108a-n) for a particular regular expression, the search for that regular expression is first made by the lower ranked hardware node 108d. If hardware node 108d is unable to identify that particular regular expression, then the incoming packet 104a is sent to hardware node 108e. In one embodiment, the incoming packet 104a is sent from the hardware node 108d to the hardware node 108e even if hardware node 108d found one or more regular expressions in the incoming packet 104a, thus giving hardware node 108e an opportunity to search for even more (perhaps more complex) regular expressions. If one or both of the hardware nodes 108d-e identify the particular regular expression within the incoming packet 104a, then the network interconnect 102 will send that packet to a particular server (not shown) on the network 106; send that packet to another hardware node from hardware nodes 108a-n; issue an alert (also not shown), etc. If none of the hardware nodes 108a-n are able to detect the particular regular expression, then the outgoing packet 104b is placed back onto the network 106 to continue unchanged to the destination IP address that was originally in the incoming packet 104a.

The incoming packet 104a may be a data packet coming from a particular IP address. In one embodiment, a specific hardware node from the hardware nodes 108a-n is dedicated to search for regular expressions coming from a set of pre-defined IP addresses, which include this particular IP address. For example, assume that hardware node 108c is dedicated to searching data packets coming from a set of IP addresses, which includes the IP source address of the incoming packet 104a. In this situation, the ingress first hardware node 108a will recognize this particular IP address as being a source IP address that hardware node 108c is to handle, and will send the incoming packet 104a to hardware node 108c, either directly or indirectly (i.e., after being first routed through other of the hardware nodes 108b-n).

In one embodiment, the incoming packet 104a may be a data packet coming from a trusted IP address. This trusted IP address is one that is "known" to the ingress first hardware node 108a as being a known, reliable, and trusted address, such that packets coming from this trusted address are trusted to be legitimate (e.g., not rogue messages, viruses, etc.), do not require security inspection (e.g., comes from an IP address location that is known to pose no threat to national or enterprise security), etc. In this embodiment, the ingress first hardware node 108a will send the incoming packet 104a directly to the egress hardware node 108n in order to place the outgoing packet 104b back onto the network 106 unchanged and unprocessed (i.e., without being searched for regular expressions) by the network interconnect 102.

In one embodiment, if one or more of the hardware nodes 108a-n identify/detect a particular predetermined regular expression, an instruction is sent to the egress hardware node 108n to send an alert to a monitoring device (not shown). This alert lets the monitoring device know which regular expression was detected, the source/destination IP address and identifier of the data packet/message, instructions on what action (e.g., notify an enterprise department, governmental agency, etc.) should be taken, etc.

In one embodiment, hardware node 108a identifies a particular regular expression. This identification of that particular regular expression results (e.g., according to a rule found in rules cache 118a) in the data packet (originally incoming packet 104a) being sent to another of the hardware nodes 108b-n, along with information about which regular expression was identified by hardware node 108a. The other hardware node (from 108b-n) can then 1) search for additional regular expressions found within its regular expression cache from regular expression caches 116a-n; 2) direct the data packet to a particular location inside (e.g., a hardware node 108a-n) or outside (e.g., a particular server) the network interconnect 102; 3) change the format/content/syntax/etc. of the data packet (e.g., in accordance with a rule from one or more of the rules caches 118a-n); etc. Similarly, if the other hardware node from hardware nodes 108b-n then detects another regular expression in the data packet, then a message can be sent to other hardware nodes from the hardware nodes 108a-n, identifying which regular expression was located by the second other hardware node.

Figure 2:
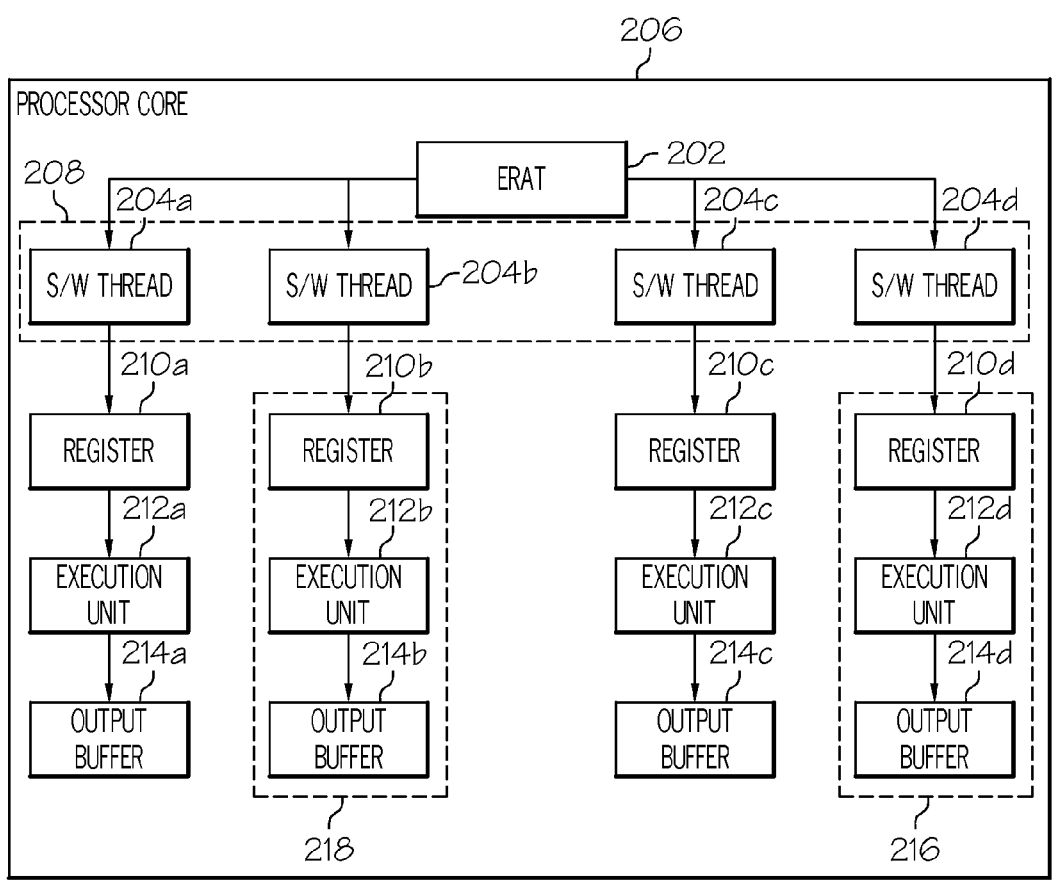
FIG. 2 illustrates additional detail of a processor core within a node on the network interconnect shown in FIG. 1.
Figure 6:
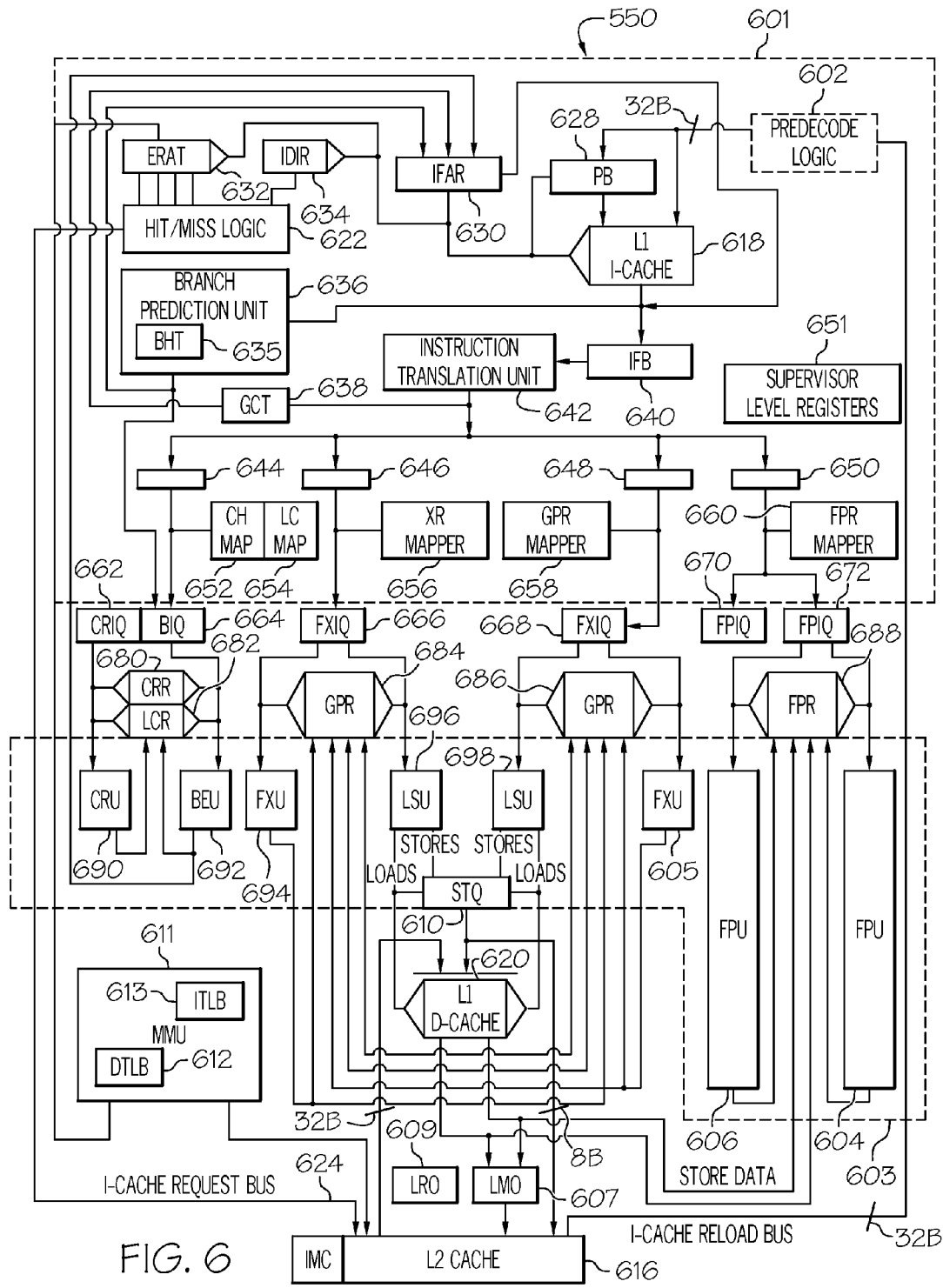
FIG. 6 depicts additional detail of a processor core found at an IP block node of the NOC shown in FIG. 5 and/or a node in the network interconnect shown in FIG. 1.

As noted above, each node (e.g., each of hardware nodes 104a-n) includes one or more processing units 112a-n. Each of the processing units includes one or more processors, and each of the processors includes one or more cores. Additional detail of an exemplary embodiment of such a processor core is presented as processor core 206 in FIG. 2. Within processor core 206 is an Effective-to-Real Address Table (ERAT) 202 which is used to dispatch different software threads 204a-d from a work unit 208, which may be a user application (e.g., user application 112 shown in FIG. 1) or a work unit message (e.g., work unit message 116 shown in FIG. 1). When the work unit 208 is received by the processor core 206 (which is within the addressed node in the NOC), a specific hardware thread 216, made up of a register 210d, an execution unit 212d, and an output buffer 214d, will execute the instructions in the software thread 204d. With reference to FIG. 6 below, an exemplary hardware thread may be composed of FPR mapper 660, FPIQ 672, FPR 688 and FPU 604. Another exemplary hardware thread may be composed of GPR mapper 658, FXIQ 668, FXU 605, and GPR 686. These are exemplary hardware threads, as others may be contemplated that include FXU 694, LSU 698, CRU 690, BEU 692, etc.

Thus, each processor core 206 is able to allocate the search for a regular expression to one or more of the software threads 204a-d, allowing such software threads to run on particular hardware threads (e.g., the specific hardware thread 216).

Figure 3:
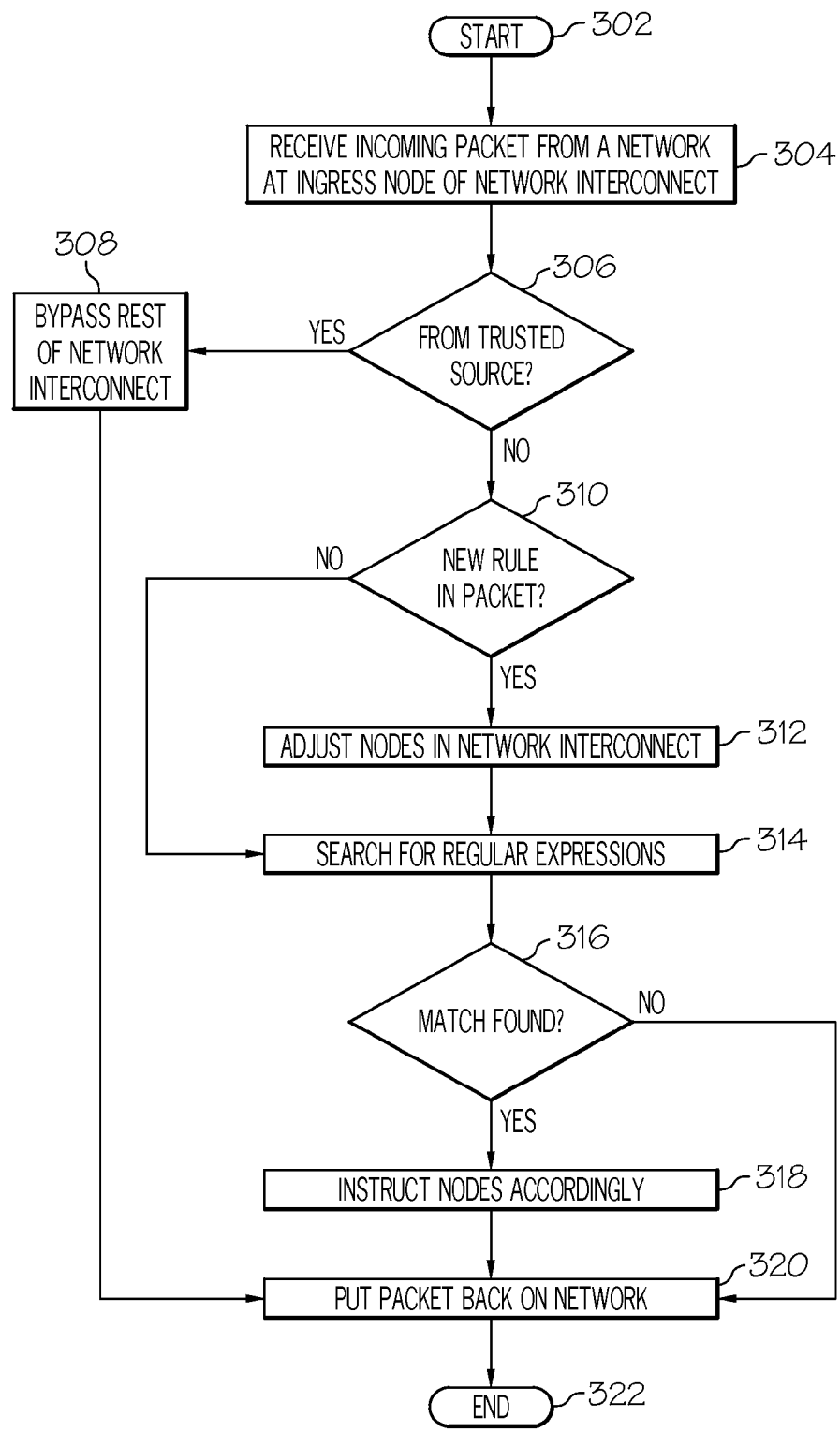
FIG. 3 is a high-level flow chart of exemplary steps taken by a network interconnect for managing data packets on a network.

Referring now to FIG. 3, a high level flow chart of one or more steps taken to manage data packets in accordance with the present disclosure is presented. After initiator block 302, a first hardware node (i.e., an ingress node) in a network interconnect receives a data packet from a network (block 304). If the data packet comes from a trusted source (query block 306), then the rest of network interconnect is bypassed (block 308) and the data packet is put back onto the network (block 320) unchanged/unprocessed (i.e., no search for a regular expression is performed by the network interconnect). However, if the data packet does not come from a trusted source (i.e., a trusted IP address), then a determination is made as to whether the data packet includes a new rule to be applied to this and subsequent data packets by the network interconnect (query block 310). If the data packet includes such a new rule, then one or more of the nodes in the network interconnect are adjusted accordingly (block 312). This adjustment may include instructions to look for a new regular expression; what actions to take regarding the data packet (e.g., send an alert of an identified regular expression within the data packet to a monitor logic; send the data packet to a particular server outside the network interconnect; send the data packet to a particular hardware node within the network interconnect; etc.), etc. The data packet is then searched by one or more nodes within the network interconnect for one or more regular expressions (block 314). If a match is made of a regular expression to a regular expression found in one or more of the nodes' regular expression caches (query block 316), then additional processing is made within the network interconnect (block 318). After all appropriate nodes within the network interconnect have had an opportunity to examine/manipulate the data packet, the packet is put back onto the network (block 320), for transmission to a particular monitoring logic, server, etc., with or without an alert message as described herein. The process ends at terminator block 322.

In one embodiment, the network interconnect 102 depicted in FIG. 1 is a Network On a Chip (NOC). Thus, with reference now to FIG. 4, a functional block diagram of an exemplary NOC 402 according to embodiments of the present invention is depicted. NOC 402 is implemented on an integrated circuit chip 400, and may be controlled by a host computer 401. The NOC 400 includes Integrated Processor ("IP") blocks 404, routers 410, memory communications controllers 406, and network interface controllers 408. Each IP block 404 is adapted to a router 410 through a dedicated memory communications controller 406 and a dedicated network interface controller 408. Each memory communications controller 406 controls communications between an IP block 404 and memory (e.g., an on-chip memory 414 and/or an off-chip memory 412), and each network interface controller 408 controls inter-IP block communications through routers 410.

In NOC 402, each IP block 404 represents a reusable unit of synchronous or asynchronous logic design used as a building block for data processing within the NOC 402. The term "IP block" is sometimes referred to as an "intellectual property block," thus designating an IP block 404 as a design that is owned by a party, which is the intellectual property of a party, to be licensed to other users or designers of semiconductor circuits. In the scope of the present invention, however, there is no requirement that IP blocks be subject to any particular ownership, so the term is always expanded in this specification as "integrated processor block." Thus, IP blocks 404, as specified here, are reusable units of logic, cell, or chip layout design that may or may not be the subject of intellectual property. Furthermore, IP blocks 404 are logic cores that can be formed as Application Specific Integrated Circuit (ASIC) chip designs or Field Programmable Gate Array (FPGA) logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHSIC Hardware Description Language (VHDL). In addition to netlist and synthesizable implementation, NOCs may also be delivered in lower-level, physical descriptions. Analog IP block elements such as a Serializer/Deserializer (SERDES), Phase-Locked Loop (PLL), Digital-to-Analog Converter (DAC), Analog-to-Digital Converter (ADC), and so on, may be distributed in a transistor-layout format such as Graphic Data System II (GDSII). Digital elements of IP blocks are sometimes offered in layout format as well.

Figure 4:
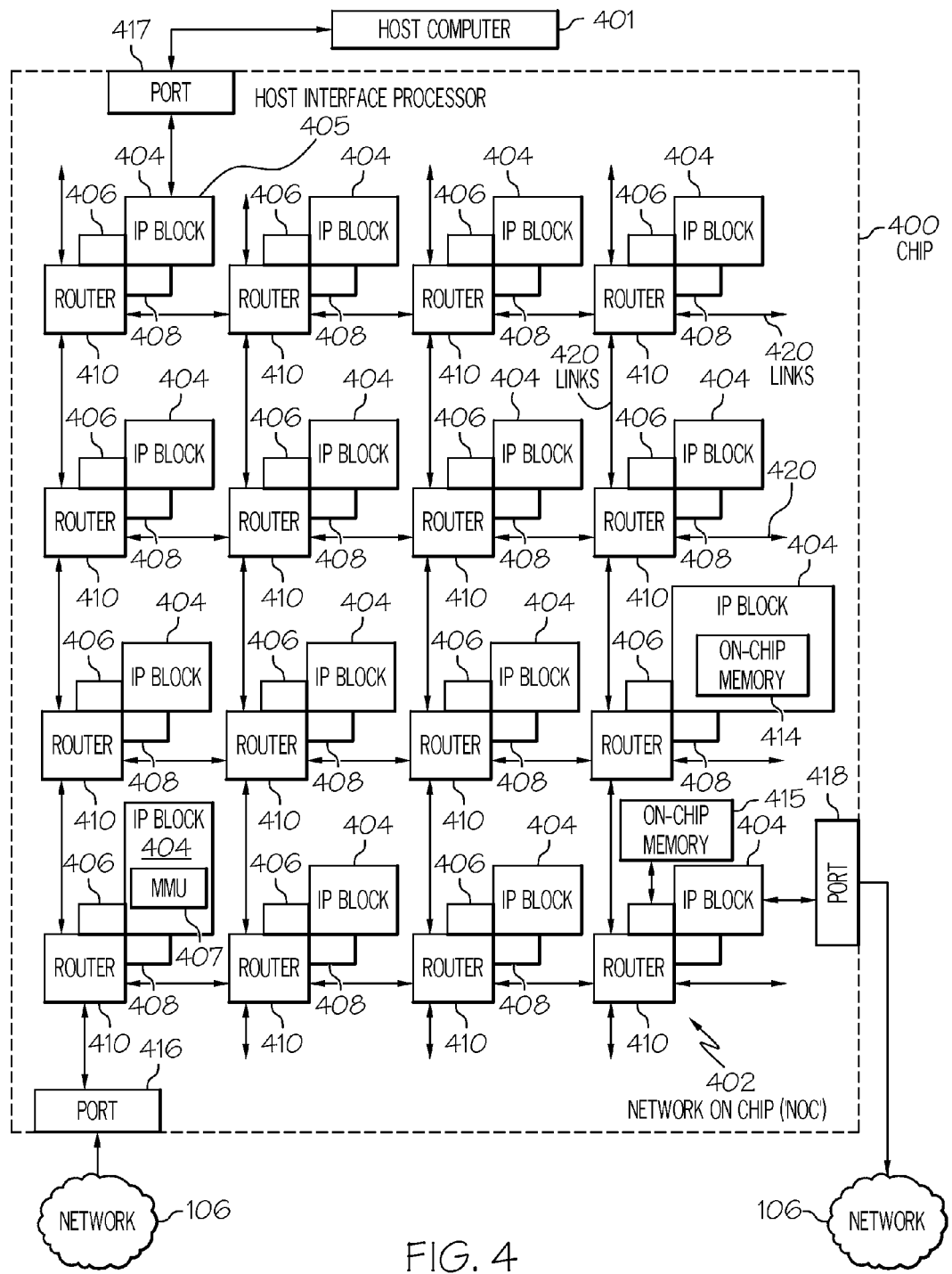
FIG. 4 depicts a Network on a Chip (NOC) that can be utilized as the network interconnect depicted in FIG. 1.

Each IP block 404 shown in FIG. 4 is adapted to a router 410 through a memory communications controller 406. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 406 are described in more detail below in FIG. 5.

Figure 5:
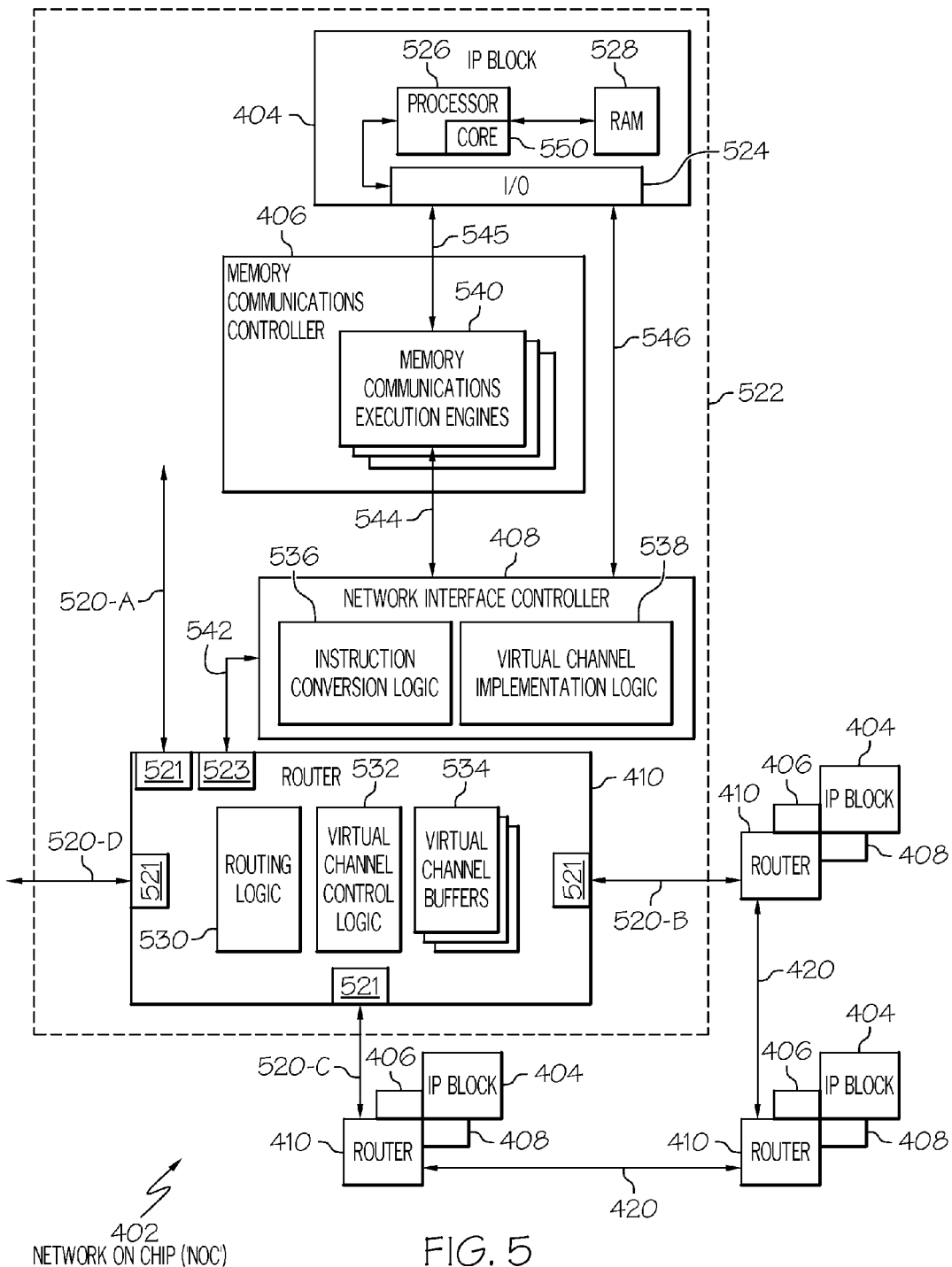
FIG. 5 illustrates additional detail of an IP block node of the NOC shown in FIG. 4.

Each IP block 404 depicted in FIG. 4 is also adapted to a router 410 through a network interface controller 408. Each network interface controller 408 controls communications through routers 410 between IP blocks 404. Examples of communications between IP blocks include messages (e.g., message/data packets) carrying data and instructions for processing the data among IP blocks in parallel applications and in pipelined applications. The network interface controllers 408 are described in more detail below in FIG. 5. Note that the network interface controllers 408 described in FIGS. 4-5 are for internal use within NOC 402. Dedicated ingress and egress IP blocks may also use such network interface controllers 408 in order to communicate with network 102, as depicted in FIG. 4.

The routers 410 and links 420 among the routers implement the network operations of the NOC 402 shown in FIG. 4. The links 420 are packet structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, thus requiring 512 wires. In addition, each link 420 is bi-directional, so that if the link packet structure includes 64 bytes, the wire bus actually contains 1024 wires between each router 410 and each of its neighbor routers 410 in the network. A message can include more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

As stated above, each memory communications controller 406 controls communications between an IP block and memory. Memory can include off-chip main RAM 412, an on-chip memory 415 that is connected directly to an IP block through a memory communications controller 406, on-chip memory enabled as an IP block 414, and on-chip caches. In the NOC 402 shown in FIG. 4, either of the on-chip memories (414, 415), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. On-chip memory 414 on an IP block can be addressed from that IP block or from any other IP block in the NOC. On-chip memory 415 is attached directly to a memory communication controller, and can be addressed by the IP block that is adapted to the network by that memory communication controller. Note that on-chip memory 415 can also be addressed from any other IP block 404 anywhere in the NOC 402.

Port 416 includes the pins and other interconnections required to conduct data packets from the network 102 to the NOC 402, as well as sufficient intelligence to convert message packets from the network 102 into the bus format required by the NOC 402. The data communications port depicted as port 418 provides a direct connection between an IP block 404 of the NOC 402 and network 102 for the transmission of outgoing packets from NOC 402. The port 418 includes the pins and other interconnections required to conduct signals between the NOC 402 and the network 102, as well as sufficient intelligence to convert message packets from the NOC packet format to the bus format required by the network 102.

In the exemplary NOC 402 shown in FIG. 4, one of the IP blocks 404 is designated a host interface processor 405. A host interface processor 405 provides an interface between the NOC 402 and a host computer 401. Host interface processor 405 provides data processing services to the other IP blocks on the NOC, including, for example, receiving and dispatching among the IP blocks of the NOC data processing requests from the host computer and/or the network 102 in order to properly manipulate incoming data packets, including the search for regular expressions within such data packets coming into the NOC 402.

Host interface processor 405 is connected to the larger host computer 401 through a data communications port such as port 417. Port 417 includes the pins and other interconnections required to conduct signals between the NOC 402 and the host computer 401, as well as sufficient intelligence to convert message packets from the NOC 402 to the bus format required by the host computer 401.

Referring now to FIG. 5, additional detail of NOC 402 is presented according to embodiments of the present invention. As depicted in FIG. 4 and FIG. 5, NOC 402 is implemented on a chip (e.g., chip 400 shown in FIG. 4), and includes integrated processor ("IP") blocks 404, routers 410, memory communications controllers 406, and network interface controllers 408. Each IP block 404 is adapted to a router 410 through a memory communications controller 406 and a network interface controller 408. Each memory communications controller 406 controls communications between an IP block and memory, and each network interface controller 408 controls inter-IP block communications through routers 410. In the example of FIG. 5, one set 522 of an IP block 404 adapted to a router 410 through a memory communications controller 406 and network interface controller 408 is expanded to aid a more detailed explanation of their structure and operations. All the IP blocks, memory communications controllers, network interface controllers, and routers in the example of FIG. 5 are configured in the same manner as the expanded set 522.

In the example of FIG. 5, each IP block 404 includes a computer processor 526, which includes one or more cores 550, and I/O functionality 524. In this example, computer memory is represented by a segment of Random Access Memory ("RAM") 528 in each IP block 404. The memory, as described above with reference to the example of FIG. 4, can occupy segments of a physical address space whose contents on each IP block are addressable and accessible from any IP block in the NOC. The processors 526, I/O capabilities 524, and memory (RAM 528) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the NOC 402 shown in FIG. 5, each memory communications controller 406 includes a plurality of memory communications execution engines 540. Each memory communications execution engine 540 is enabled to execute memory communications instructions from an IP block 504, including bidirectional memory communications instruction flow (544, 545, 546) between the network interface controller 408 and the IP block 404. The memory communications instructions executed by the memory communications controller may originate, not only from the IP block adapted to a router through a particular memory communications controller, but also from any IP block 404 anywhere in the NOC 402. That is, any IP block 404 in the NOC 402 can generate a memory communications instruction and transmit that memory communications instruction through the routers 410 of the NOC 402 to another memory communications controller associated with another IP block for execution of that memory communications instruction. Such memory communications instructions can include, for example, translation lookaside buffer control instructions, cache control instructions, barrier instructions, and memory load and store instructions.

Each of the depicted memory communications execution engines 540 is enabled to execute a complete memory communications instruction separately and in parallel with other memory communications execution engines 540. The memory communications execution engines 540 implement a scalable memory transaction processor optimized for concurrent throughput of memory communications instructions. The memory communications controller 406 supports multiple memory communications execution engines 540, all of which run concurrently for simultaneous execution of multiple memory communications instructions. A new memory communications instruction is allocated by the memory communications controller 406 to each memory communications execution engine 540, and the memory communications execution engines 540 can accept multiple response events simultaneously. In this example, all of the memory communications execution engines 540 are identical. Scaling the number of memory communications instructions that can be handled simultaneously by a memory communications controller 406, therefore, is implemented by scaling the number of memory communications execution engines 540.

In the NOC 402 depicted in FIG. 5, each network interface controller 408 is enabled to convert communications instructions from command format to network packet format for transmission among the IP blocks 404 through routers 410. The communications instructions are formulated in command format by the IP block 410 or by the memory communications controller 406 and provided to the network interface controller 408 in command format. The command format is a native format that conforms to architectural register files of the IP block 404 and the memory communications controller 406. The network packet format is the format required for transmission through routers 410 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC 402 shown in FIG. 5, each IP block 404 is enabled to send memory-address-based communications to and from memory through the IP block's memory communications controller and then also through its network interface controller to the network. A memory-address-based communications is a memory access instruction, such as a load instruction or a store instruction, which is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communications that are executed with message traffic are passed from the memory communications controller to an associated network interface controller for conversion (using instruction conversion logic 536) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 406 is naturally also the network location of that memory communication controller's associated router 410, network interface controller 408, and IP block 404. The instruction conversion logic 536 within each network interface controller is capable of converting memory addresses to network addresses for purposes of transmitting memory-address-based communications through routers of a NOC.

Upon receiving message traffic from routers 410 of the network, each network interface controller 408 inspects each packet for memory instructions. Each packet containing a memory instruction is handed to the memory communications controller 406 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

Returning now to the NOC 402 as depicted in FIG. 5, each IP block 404 is enabled to bypass its memory communications controller 406 and send inter-IP block, network-addressed communications 546 directly to the network through the IP block's network interface controller 408. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through its I/O functions 524 directly to the IP block's network interface controller in command format, then converted to packet format by the network interface controller and transmitted through routers of the NOC to another IP block. Such network-addressed communications 546 are bi-directional, potentially proceeding to and from each IP block of the NOC, depending on their use in any particular application. Each network interface controller, however, is enabled to both send and receive (communication 542) such communications to and from an associated router, and each network interface controller is enabled to both send and receive (communication 546) such communications directly to and from an associated IP block, bypassing an associated memory communications controller 406.

Each network interface controller 408 in the example of FIG. 5 is also enabled to implement virtual channels on the network, characterizing network packets by type. Each network interface controller 408 includes virtual channel implementation logic 538 that classifies each communication instruction by type and records the type of instruction in a field of the network packet format before handing off the instruction in packet form to a router 410 for transmission on the NOC. Examples of communication instruction types include inter-IP block network-address-based messages, request messages, responses to request messages, invalidate messages directed to caches; memory load and store messages; and responses to memory load messages, and so on.

Each router 410 in the example of FIG. 5 includes routing logic 530, virtual channel control logic 532, and virtual channel buffers 534. The routing logic typically is implemented as a network of synchronous and asynchronous logic that implements a data communications protocol stack for data communication in the network formed by the routers 410, links 420, and bus wires among the routers. The routing logic 530 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports 521 connected through bus wires (520-A, 520-B, 520-C, 520-D) to other routers and a fifth port 523 connecting each router to its associated IP block 404 through a network interface controller 408 and a memory communications controller 406.

In describing memory-address-based communications above, each memory address was described as mapped by network interface controllers to a network address, a network location of a memory communications controller. The network location of a memory communications controller 406 is naturally also the network location of that memory communication controller's associated router 410, network interface controller 408, and IP block 404. In inter-IP block, or network-address-based communications, therefore, it is also typical for application-level data processing to view network addresses as the locations of IP blocks within the network formed by the routers, links, and bus wires of the NOC. Note that FIG. 4 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In the NOC 402 depicted in FIG. 5, each router 410 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 410 depicted in FIG. 5 also includes virtual channel control logic 532 and virtual channel buffers 534. The virtual channel control logic 532 examines each received packet for its assigned communications type and places each packet in an outgoing virtual channel buffer for that communications type for transmission through a port to a neighboring router on the NOC.

Each virtual channel buffer 534 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 534 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 408. Each network interface controller is configured to, upon receipt of such a signal, refuse to accept, from its associated memory communications controller 406 or from its associated IP block 404, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 5. When a router encounters a situation in which a packet might be dropped in some unreliable protocol such as, for example, the Internet Protocol, the routers in the example of FIG. 5 suspend by their virtual channel buffers 534 and their virtual channel control logic 532 all transmissions of packets in a virtual channel until buffer space is again available, eliminating any need to drop packets. The NOC 402, as depicted in FIG. 5, therefore, implements highly reliable network communications protocols with an extremely thin layer of hardware.

Referring now to FIG. 6, additional exemplary detail of core 550, originally presented in FIG. 5, is presented. Core 550 includes an on-chip multi-level cache hierarchy including a unified level two (L2) cache 616 and bifurcated level one (L1) instruction (I) and data (D) caches 618 and 620, respectively. As is well-known to those skilled in the art, caches 616, 618 and 620 provide low latency access to cache lines corresponding to memory locations in system memories (e.g., RAM 306 shown in FIG. 3).

Instructions are fetched for processing from L1 I-cache 618 in response to the effective address (EA) residing in instruction fetch address register (IFAR) 630. During each cycle, a new instruction fetch address may be loaded into IFAR 630 from one of three sources: branch prediction unit (BPU) 636, which provides speculative target path and sequential addresses resulting from the prediction of conditional branch instructions, global completion table (GCT) 638, which provides flush and interrupt addresses, and branch execution unit (BEU) 692, which provides non-speculative addresses resulting from the resolution of predicted conditional branch instructions. Associated with BPU 636 is a branch history table (BHT) 635, in which are recorded the resolutions of conditional branch instructions to aid in the prediction of future branch instructions.

An effective address (EA), such as the instruction fetch address within IFAR 630, is the address of data or an instruction generated by a processor. The EA specifies a segment register and offset information within the segment. To access data (including instructions) in memory, the EA is converted to a real address (RA), through one or more levels of translation, associated with the physical location where the data or instructions are stored.

Within core 550, effective-to-real address translation is performed by memory management units (MMUs) and associated address translation facilities. Preferably, a separate MMU is provided for instruction accesses and data accesses. In FIG. 6, a single MMU 611 is illustrated, for purposes of clarity, showing connections only to Instruction Store Unit (ISU) 601. However, it is understood by those skilled in the art that MMU 611 also preferably includes connections (not shown) to load/store units (LSUs) 696 and 698 and other components necessary for managing memory accesses. MMU 611 includes Data Translation Lookaside Buffer (DTLB) 612 and Instruction Translation Lookaside Buffer (ITLB) 613. Each TLB contains recently referenced page table entries, which are accessed to translate EAs to RAs for data (DTLB 612) or instructions (ITLB 613). Recently referenced EA-to-RA translations from ITLB 613 are cached in EOP effective-to-real address table (ERAT) 632.

If hit/miss logic 622 determines, after translation of the EA contained in IFAR 630 by ERAT 632 and lookup of the real address (RA) in I-cache directory 634, that the cache line of instructions corresponding to the EA in IFAR 630 does not reside in L1 I-cache 618, then hit/miss logic 622 provides the RA to L2 cache 616 as a request address via I-cache request bus 624. Such request addresses may also be generated by prefetch logic within L2 cache 616 based upon recent access patterns. In response to a request address, L2 cache 616 outputs a cache line of instructions, which are loaded into prefetch buffer (PB) 628 and L1 I-cache 618 via I-cache reload bus 626, possibly after passing through optional predecode logic 602.

Once the cache line specified by the EA in IFAR 630 resides in L1 cache 618, L1 I-cache 618 outputs the cache line to both branch prediction unit (BPU) 636 and to instruction fetch buffer (IFB) 640. BPU 636 scans the cache line of instructions for branch instructions and predicts the outcome of conditional branch instructions, if any. Following a branch prediction, BPU 636 furnishes a speculative instruction fetch address to IFAR 630, as discussed above, and passes the prediction to branch instruction queue 664 so that the accuracy of the prediction can be determined when the conditional branch instruction is subsequently resolved by branch execution unit 692.

IFB 640 temporarily buffers the cache line of instructions received from L1 I-cache 618 until the cache line of instructions can be translated by instruction translation unit (ITU) 642. In the illustrated embodiment of core 550, ITU 642 translates instructions from user instruction set architecture (UISA) instructions into a possibly different number of internal ISA (IISA) instructions that are directly executable by the execution units of core 550. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 638 to an instruction group, the members of which are permitted to be dispatched and executed out-of-order with respect to one another. Global completion table 638 tracks each instruction group for which execution has yet to be completed by at least one associated EA, which is preferably the EA of the oldest instruction in the instruction group.

Following UISA-to-IISA instruction translation, instructions are dispatched to one of latches 644, 646, 648 and 650, possibly out-of-order, based upon instruction type. That is, branch instructions and other condition register (CR) modifying instructions are dispatched to latch 644, fixed-point and load-store instructions are dispatched to either of latches 646 and 648, and floating-point instructions are dispatched to latch 650. Each instruction requiring a rename register for temporarily storing execution results is then assigned one or more rename registers by the appropriate one of CR mapper 652, link and count (LC) register mapper 654, exception register (XER) mapper 656, general-purpose register (GPR) mapper 658, and floating-point register (FPR) mapper 660.

The dispatched instructions are then temporarily placed in an appropriate one of CR issue queue (CRIQ) 662, branch issue queue (BIQ) 664, fixed-point issue queues (FXIQs) 666 and 668, and floating-point issue queues (FPIQs) 670 and 672. From issue queues 662, 664, 666, 668, 670 and 672, instructions can be issued opportunistically to the execution units of processing unit 603 for execution as long as data dependencies and antidependencies are observed. The instructions, however, are maintained in issue queues 662-672 until execution of the instructions is complete and the result data, if any, are written back, in case any of the instructions need to be reissued.

As illustrated, the execution units of core 550 include a CR unit (CRU) 690 for executing CR-modifying instructions, a branch execution unit (BEU) 692 for executing branch instructions, two fixed-point units (FXUs) 694 and 605 for executing fixed-point instructions, two load-store units (LSUs) 696 and 698 for executing load and store instructions, and two floating-point units (FPUs) 606 and 604 for executing floating-point instructions. Each of execution units 690-604 is preferably implemented as an execution pipeline having a number of pipeline stages.

During execution within one of execution units 690-604, an instruction receives operands, if any, from one or more architected and/or rename registers within a register file coupled to the execution unit. When executing CR-modifying or CR-dependent instructions, CRU 690 and BEU 692 access the CR register file 680, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) file 682 contains a count register (CTR), a link register (LR) and rename registers of each, by which BEU 692 may also resolve conditional branches to obtain a path address. General-purpose register files (GPRs) 684 and 686, which are synchronized, duplicate register files and store fixed-point and integer values accessed and produced by FXUs 694 and 605 and LSUs 696 and 698. Floating-point register file (FPR) 688, which like GPRs 684 and 686 may also be implemented as duplicate sets of synchronized registers, contains floating-point values that result from the execution of floating-point instructions by FPUs 606 and 604 and floating-point load instructions by LSUs 696 and 698.

After an execution unit finishes execution of an instruction, the execution notifies GCT 638, which schedules completion of instructions in program order. To complete an instruction executed by one of CRU 690, FXUs 694 and 605 or FPUs 606 and 604, GCT 638 signals the execution unit, which writes back the result data, if any, from the assigned rename register(s) to one or more architected registers within the appropriate register file. The instruction is then removed from the issue queue, and once all instructions within its instruction group have been completed, is removed from GCT 638. Other types of instructions, however, are completed differently.

When BEU 692 resolves a conditional branch instruction and determines the path address of the execution path that should be taken, the path address is compared against the speculative path address predicted by BPU 636. If the path addresses match, no further processing is required. If, however, the calculated path address does not match the predicted path address, BEU 692 supplies the correct path address to IFAR 630. In either event, the branch instruction can then be removed from BIQ 664, and when all other instructions within the same instruction group have completed executing, from GCT 638.

Following execution of a load instruction, the effective address computed by executing the load instruction is translated to a real address by a data ERAT (not illustrated) and then provided to L1 D-cache 620 as a request address. At this point, the load instruction is removed from FXIQ 666 or 668 and placed in load reorder queue (LRQ) 609 until the indicated load is performed. If the request address misses in L1 D-cache 620, the request address is placed in load miss queue (LMQ) 607, from which the requested data is retrieved from L2 cache 616, and failing that, from another core 550 or from system memory (e.g., RAM 528 shown in FIG. 5). LRQ 609 snoops exclusive access requests (e.g., read-with-intent-to-modify), flushes or kills on interconnect fabric (not shown) against loads in flight, and if a hit occurs, cancels and reissues the load instruction. Store instructions are similarly completed utilizing a store queue (STQ) 610 into which effective addresses for stores are loaded following execution of the store instructions. From STQ 610, data can be stored into either or both of L1 D-cache 620 and L2 cache 616.

Note that core 550 has state, which includes stored data, instructions and hardware states at a particular time, and are herein defined as either being "hard" or "soft." The "hard" state is defined as the information within core 550 that is architecturally required for core 550 to execute a process from its present point in the process. The "soft" state, by contrast, is defined as information within core 550 that would improve efficiency of execution of a process, but is not required to achieve an architecturally correct result. In core 550, the hard state includes the contents of user-level registers, such as CRR 680, LCR 682, GPRs 684 and 686, FPR 688, as well as supervisor level registers 651. The soft state of core 550 includes both "performance-critical" information, such as the contents of L-1 I-cache 618, L-1 D-cache 620, address translation information such as DTLB 612 and ITLB 613, and less critical information, such as BHT 635 and all or part of the content of L2 cache 616. Whenever a software thread (e.g., first software thread 124 and/or second software thread 126) enter or leave core 550, the hard and soft states are respectively populated or restored, either by directly populating the hard/soft states into the stated locations, or by flushing them out entirely using context switching.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of managing data packets, the method comprising:
  a first hardware node in a network interconnect receiving a data packet from a network;
  the first hardware node examining the data packet for a particular regular expression, wherein the data packet is from a particular internet protocol (IP) address, wherein the particular regular expression is a predefined pattern of non-executable characters, wherein the predefined pattern of non-executable characters forms a text phrase that describes a particular subject matter, wherein the first hardware node comprises a first regular expression cache that stores a copy of a first regular expression, and wherein the first hardware node examines the data packet by searching the data packet for the first regular expression that is stored in the first regular expression cache within the first hardware node;
  in response to the first hardware node failing to identify the first regular expression in the data packet by matching the particular regular expression to the first regular expression, forwarding the data packet from the first hardware node to a second hardware node in the network interconnect for further examination of the data, wherein the second hardware node examines the data packet by searching the data packet for a second regular expression that is stored in a second regular expression cache within the second hardware node;
  establishing a hierarchy of multiple hardware nodes in the network interconnect, wherein higher hardware nodes in the hierarchy are capable of detecting more complex regular expressions as compared with lower hardware nodes in the hierarchy;
  sequentially sending the data packet through lower to higher hardware nodes in the hierarchy until the particular regular expression is identified;
  in response to determining that the particular IP address is from a trusted IP address, bypassing the second hardware node and sending the data packet directly to an egress hardware node on the network interconnect; and
  sending the data packet from the egress hardware node back to the network.

2. The method of claim 1, further comprising:
  detecting a new rule, wherein the new rule describes a new course of action to be taken to manage the data packet that contains the particular regular expression; and
  populating rules caches in the first and second hardware nodes with the new rule.

3. The method of claim 2, further comprising:
  in response to the new rule defining a new set of regular expressions to be searched by the network interconnect, populating regular expression caches in the first and second hardware nodes with the new set of regular expressions.

4. The method of claim 2, wherein the second hardware node is an egress node that forwards the data packet to a destination location on the network, the method further comprising:
  in response to the new rule describing a new destination location for any data packet that contains the particular regular expression, transmitting the data packet that contains the particular regular expression to the new destination location.

5. The method of claim 1, further comprising:
dedicating a specific hardware node in the network interconnect to search for the particular regular expression within data packets coming from a set of predefined IP addresses;
in response to determining that the particular IP address is within the set of predefined IP addresses, sending the data packet to the specific hardware node; and
the specific hardware node examining the data packet for the particular regular expression.

6. The method of claim 1, further comprising:
in response to the network interconnect detecting the particular regular expression in the data packet, sending an alert to a monitoring device, wherein the alert describes the presence of the particular regular expression in the data packet.

7. The method of claim 1, further comprising:
in response to the first hardware node detecting the particular regular expression in the data packet, transmitting a message to multiple hardware nodes in the network interconnect, wherein the message identifies the particular regular expression that was detected by the first hardware node.

8. The method of claim 1, further comprising:
in response to the second hardware node detecting another regular expression in the data packet, transmitting a message to multiple hardware nodes in the network interconnect, wherein the message identifies said another regular expression that was detected by the second hardware node.

9. A network interconnect oriented within a network to intercept data packets on the network, the network interconnect comprising;
a first hardware node in the network interconnect for receiving a data packet from the network, wherein the data packet is from a particular internet protocol (IP) address, wherein the first hardware node comprises logic for examining the data packet for a regular expression, wherein the regular expression is a predefined pattern of non-executable characters, wherein the predefined pattern of non-executable characters forms a text phrase that describes a particular subject matter, wherein the first hardware node comprises a first regular expression cache that stores a copy of a first regular expression, and wherein the first hardware node examines the data packet by searching the data packet for the first regular expression that is stored in the first regular expression cache within the first hardware node; and
a second hardware node in the network interconnect, wherein the second hardware node:
receives the data packet from the first hardware node in response to the first hardware node failing to identify the regular expression in the data packet;
examines the data packet in order to search for the regular expression in the data packet; and
in response to the first hardware node failing to identify the first regular expression in the data packet by matching the particular regular expression to the first regular expression, receives the data packet from the first hardware node for further examination of the data, wherein the second hardware node examines the data packet by searching the data packet for a second regular expression that is stored in a second regular expression cache within the second hardware node;
and wherein the network interconnect further:
establishes a hierarchy of multiple hardware nodes in the network interconnect, wherein higher hardware nodes in the hierarchy are capable of detecting more complex regular expressions as compared with lower hardware nodes in the hierarchy;
sequentially sends the data packet through lower to higher hardware nodes in the hierarchy until the particular regular expression is identified;
in response to determining that the particular IP address is from a trusted IP address, bypasses the second hardware node and sending the data packet directly to an egress hardware node on the network interconnect; and
sends the data packet from the egress hardware node back to the network.

10. The network interconnect of claim 9, further comprising:
rules caches in the first and second hardware nodes; and
regular expression caches in the first and second hardware nodes, wherein the rules caches store rules that describe which regular expressions in the regular expression caches are to be searched by particular hardware nodes.

11. The network interconnect of claim 9, wherein the network interconnect is a network on a chip (NOC).

12. The network interconnect of claim 11, wherein nodes on the NOC are assigned a ranking according to a hierarchy of nodes in the NOC, wherein higher nodes in the hierarchy are capable of detecting more complex regular expressions as compared with lower nodes in the hierarchy.

13. The network interconnect of claim 12, wherein specific nodes in the NOC are dedicated to searching for the regular expression within data packets coming from a set of predefined IP addresses.

14. A non-transitory computer-readable storage medium on which is encoded a computer program, the computer program comprising computer executable instructions configured for:
receiving, by a first hardware node in a network interconnect, a data packet from a network;
examining, by the first hardware node in the network interconnect, the data packet for a regular expression, wherein the data packet is from a particular internet protocol (IP) address, wherein the regular expression is a predefined pattern of non-executable characters, wherein the predefined pattern of non-executable characters forms a text phrase that describes a particular subject matter, wherein the first hardware node comprises a first regular expression cache that stores a copy of a first regular expression, and wherein the first hardware node examines the data packet by searching the data packet for the first regular expression that is stored in the first regular expression cache within the first hardware node;
in response to the first hardware node failing to identify the regular expression in the data packet by matching the particular regular expression to the first regular expression, forwarding the data packet to a second hardware node in the network interconnect for further examination of the data packet in order to search for a second regular expression, in the data packet, that is stored in a second regular expression cache within the second hardware node;
establishing a hierarchy of multiple hardware nodes in the network interconnect, wherein higher hardware nodes in the hierarchy are capable of detecting more complex regular expressions as compared with lower hardware nodes in the hierarchy;
sequentially sending the data packet through lower to higher hardware nodes in the hierarchy until the particular regular expression is identified;

in response to determining that the particular IP address is from a trusted IP address, bypassing the second hardware node and sending the data packet directly to an egress hardware node on the network interconnect; and sending the data packet from the egress hardware node back to the network.

15. The non-transitory computer-readable storage medium of claim 14, wherein the computer executable instructions are further configured for:

detecting a new rule, wherein the new rule describes a new course of action to be taken to manage the data packet that contains the regular expression; and populating rules caches in the first and second hardware nodes with the new rule.

16. The non-transitory computer-readable storage medium of claim 15, wherein the computer executable instructions are further configured for:

in response to the new rule defining a new set of regular expressions to be searched by the network interconnect, populating list caches in the first and second hardware nodes with the new set of regular expressions.

17. The non-transitory computer-readable storage medium of claim 13, wherein the computer executable instructions are further configured for:

in response to the network interconnect detecting the regular expression in the data packet, sending an alert to a monitoring device, wherein the alert describes the presence of the regular expression in the data packet.

* * * * *